Patented Oct. 24, 1950

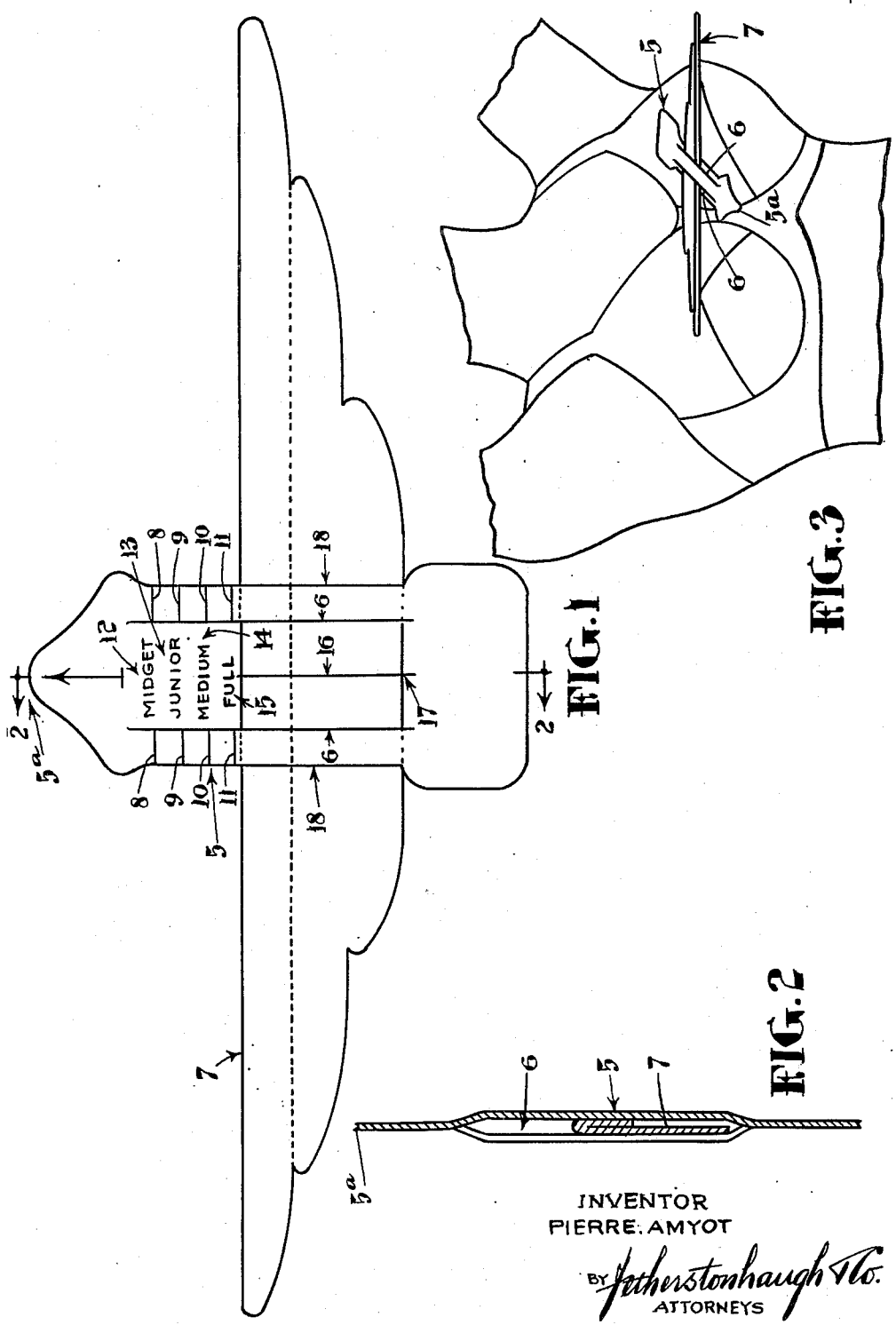

2,527,206

UNITED STATES PATENT OFFICE 2,527,206

BREAST DEVELOPMENT MEASURING DEVICE

Pierre Amyot, Quebec, Quebec, Canada

Application December 19, 1945, Serial No. 635,879

3 Claims. (Cl. 33—169)

This invention relates to a breast development measuring device for use in connection with the designing or fitting of brassières and other garments provided with breast pockets.

More particularly, the invention comprises a calibrated scale member adapted to be arranged in the hollow between the breasts in horizontal alignment with the nipples and with one end of said member touching the bottom of the hollow and a second member extending transversely across the scale member and slidably connected therewith, said second member being movable along the scale member to a breast-depth indicating position against the nipples of both breasts to thereby indicate the depth of separation of the breasts.

A preferred embodiment of the invention is shown in the accompanying drawings, in which—

Fig. 1 is a plan view of a breast development measuring device embodying the invention.

Fig. 2 is a longitudinal sectional view taken substantially along the line 2—2 of Fig. 1.

Fig. 3 is a perspective view showing the manner in which the device is used to determine the cup size of the breast pockets called for by the breast development.

Referring more particularly to the drawings, 5 designates a scale member provided with two laterally spaced, longitudinally extending slots 6 through which a transversely extending member 7 is threaded so that the ends of member 7 project a substantial distance beyond the sides of member 5. The length of the slots 6 is substantially greater than the width of the central portion of member 7 so that the latter is slidably movable along the slots to various positions of adjustment. Member 5 is preferably formed with a substantially pointed end 5a. Member 5 is also provided with a measuring scale including division lines 8, 9, 10 and 11 and extends across portions of member 5 lying outwardly of the slots 6 in the vicinity of the pointed end 5a. This measuring scale is graduated in terms of midget, junior, medium and full, as indicated by the applied legends 12, 13, 14 and 15.

The central portion of member 7 is provided with a guide line 16 which serves, in conjunction with a guide line 17 extending longitudinally of member 5 between the slots 6, to assist the user in maintaining the member 7 properly centered and at right angles to member 5 during adjustment of member 7 along the slots 6. This maintenance of the proper positioning of member 7 relative to member 5 during adjustment of member 7 is also assisted by guide lines 18 marked on member 7 and lying close to and parallel with the outer side edges of the slotted portions of member 5.

The device described herein is used as shown in Fig. 3. The scale member 5 is arranged in the hollow A between the breasts B in horizontal alignment with the nipples of the breasts and with one end of said member touching the bottom of the hollow. Member 7 is adjusted along the slots of member 5 until the longitudinal edges of member 7 nearest the breasts are touching the nipples of both breasts. These edges of member 7 will then indicate on member 5 whether the development or depth of the separation of the breasts falls within the midget, junior, medium or full range.

Having thus described the nature of my invention and a preferred embodiment thereof, it will be understood that various modifications may be resorted to within the scope and spirit of the invention as defined by the appended claims.

I claim:

1. A breast development measuring device of the character described, comprising an elongated calibrated scale member made of thin sheet material and adapted to be arranged in the hollow between the breasts with its side edges disposed in horizontal alignment with the nipples and with one end of said member touching the bottom of said hollow, and a second member made of thin sheet material and extending transversely across the scale member and movable along the latter to a breast depth indicating position in which the inner longitudinal edge of said second member is butted against the nipples of both breasts to thereby indicate the development or depth of separation of the breasts, said scale member being provided with a pair of parallel longitudinally extending slits and said second member being threaded through said slits so that said second member overlies that portion of the scale member which is located between the slits and underlies those portions of the scale member which are disposed outwardly of the slits, the width of said second member being substantially less than the length of said slits, straight, parallel guide lines extending transversely across said second member and being symmetrically located at opposite sides of the transverse centre of said second member and being spaced apart to serve in conjunction with the side edges of the scale member to assist the user in maintaining the two members in right angular relation to each other during adjustment of the second member relative to the scale member.

2. A breast development measuring device of the character described, comprising a calibrated scale member made of thin sheet material and adapted to be arranged in the hollow between the breasts with its side edges disposed in horizontal alignment with the nipples and with one end of said member touching the bottom of said hollow, said scale member being provided with a pair of parallel, longitudinally extending slits lying between and parallel with the central axis and the side edges of said member, a central guide line extending along the central axis of said scale member between said slits, graduation lines extending transversely across portions of said scale member lying outwardly of and opposite said slits, a second member made of thin sheet material and extending transversely across the scale member and through said slits, said second member being movable along the length of the scale member to a breast depth indicating position in which a straight inner longitudinal edge of said second member is butted against the nipples of both breasts, a straight guide line extending along the central transverse axis of said second member and adapted to be aligned with the guide line of the scale member, transversely extending guide lines extending along the second member at opposite sides of and in spaced relation to the central axis of said second member, said last mentioned guide lines being spaced apart a distance approximately equal to the width of the scale member, and serving, in conjunction with the side edges of the scale member, to assist the user in maintaining the two members in right angular relation to each other during adjustment of the second member relative to the first member.

3. A breast development measuring device as set forth in claim 1, including a straight central guide line extending along the longitudinal axis of that portion of the scale member which lies between the slits and a cooperating straight guide line extending along the central axis of said second member and adapted to be aligned with the central guide line of the scale member.

PIERRE AMYOT.

REFERENCES CITED

The following references are of record in the file of this patent:

UNITED STATES PATENTS

| Number | Name | Date |
|---|---|---|
| 1,216,879 | Stuppillo | Feb. 20, 1917 |
| 1,221,557 | Madden | Apr. 3, 1917 |
| 1,292,654 | Seghers | Jan. 28, 1919 |
| 2,160,723 | Eldridge | May 30, 1939 |
| 2,179,658 | Gallagher | Nov. 14, 1939 |

FOREIGN PATENTS

| Number | Country | Date |
|---|---|---|
| 103,555 | Great Britain | Sept. 18, 1916 |
| 560,474 | Great Britain | Apr. 5, 1944 |